United States Patent [19]
Wardell

[11] Patent Number: 6,158,426
[45] Date of Patent: Dec. 12, 2000

[54] WATER CIRCULATED GRILL WITH WATER CATCHING STEAMER

[76] Inventor: Lawrence Wardell, 653 E. 4025 South, Salt Lake City, Utah 84107

[21] Appl. No.: 09/521,002

[22] Filed: Mar. 7, 2000

[51] Int. Cl.[7] .................. A47J 37/00; F24B 3/00
[52] U.S. Cl. .............. 126/25 R; 126/5; 126/41 R; 126/152 B; 126/20; 99/425; 99/400; 99/445
[58] Field of Search .................. 126/25 R, 29, 126/5, 152 R, 20, 34, 152 B, 344, 54, 164, 30, 41 R, 299 F, 53; 122/371, 374; 108/50.18; 99/425, 400, 408, 445, 446, 450, 444

[56] References Cited

U.S. PATENT DOCUMENTS

| | | | |
|---|---|---|---|
| 4,632,089 | 12/1986 | Wardell | 126/25 R |
| 4,913,039 | 4/1990 | Sutphen | 99/339 |
| 5,009,151 | 4/1991 | Hungerford | 99/445 |
| 5,044,266 | 9/1991 | Geogaris | 99/446 |
| 5,189,945 | 3/1993 | Hennick | 126/25 R |
| 5,211,105 | 5/1993 | Liu | 99/400 |
| 5,363,752 | 11/1994 | Weil | 99/445 |

*Primary Examiner*—Ira S. Lazarus
*Assistant Examiner*—Josiah C. Cocks

[57] ABSTRACT

A water circulated grill with spaced apart food supporting tubes and with a water catching system including spaced apart collection troughs to receive condensed water dropping from the sides of the water cooled supporting tubes and heat supply source positioned beneath the collection troughs to supply heat upwardly between the water collection troughs to cook food placed on the food supporting tubes and to heat the collection troughs and vaporize water collected therein.

2 Claims, 1 Drawing Sheet

WATER CIRCULATED GRILL WITH WATER CATCHING STEAMER

STATEMENT REGARDING FEDERALLY SPONSORED RESEARCH OR DEVELOPMENT

Not Applicable

CROSS REFERENCE TO RELATED APPLICATIONS

Not Applicable

REFERENCE TO A MICROFICHE APPENDIX

Not Applicable

BACKGROUND OF THE INVENTION

This invention relates to barbecue grills and is particularly concerned with such grills having a water circulating system for maintaining food support systems cool and clean as food thereon is cooked. A grill of the type described is disclosed in U.S. Pat. No. 4,632,089.

BRIEF SUMMARY OF THE INVENTION

It has been found that with food cooking grills having water circulating systems for maintaining the food support systems thereof cool and clean as the food is cooked water collects on the cooled food support systems and falls along with grease and drippings from the food being cooked onto the heat source for the grill. The dropped water, along with the drippings from the food can significantly adversely affect the efficiency of the heat source. Both water and food drippings accumulating on the heat source have proven to be damaging, with time, to the burners or other heat sources used. The water droplets may be heated to form steam, but the steam formed may also include smoke and grease that has also been formed as the material dropped onto the heat source is heated. Consequently, the materials dropped onto the heat source may burn and smoke and the water component may steam and evaporate only to condense and provide a grease coating on the interior of the somewhat cooler grill housing. Periodically, thereafter, the accumulated coating must be removed for cleanliness and sanitation reasons Principal objects of the present invention are to provide a cooking grid having a water circulating food support system that will remain cool and clean, even as food is cooked on the support system; that will collect water condensing on and falling from the food support system without collecting significant amounts of food drippings from food cooked on the food support system; that will protect the heat source of the grid from the water and food drippings; and that will provide for steam assisted cooking of food on the support system.

Principal features of the invention include a housing within which food is cooked while resting on a cooking grill. The cooking grid is formed as interconnected tubes through which water is circulated. Food to be cooked is placed on a top surface of the grid. A heat source, which may be a burner or a plurality of burners supplied with fuel, such as propane, is positioned in a lower portion of the housing. A support screen is positioned in the housing, above the heat source and acts as a heat distributor, causing the heat from the heat source to be more evenly distributed upwardly from the heat source. Briquettes, loosely placed on the support screen further assist in distributing the heat upwardly and may provide selected flavoring to the food as it is cooked.

A drip water collector, comprising a plurality of interconnected collection troughs, is positioned in the housing, between the cooking grid and the support screen and briquettes supported thereby. Each collection trough is positioned beneath a water circulating tube of the cooking grill and will receive water collecting on the water circulating tube and dropping from the tube. Each collection trough extends from a bottom upwardly on opposite sides to terminate in side edges positioned just outside the outermost sides of the water circulating tube positioned above the trough. The collection troughs making up the drip water collector are spaced apart and are held together by support straps to which the collection troughs are connected.

With the drip water collector spaced beneath the cooking grid and the collection troughs beneath a water circulating tube water condensing on and falling from the water circulating tubes is caught in the collection troughs, which are heated by the heat source and heat passing upwardly through the support screen and briquettes. The water caught in the collection troughs is then heated to form steam that rises from the collection troughs to be used in the cooking of food on the cooking grid. At the same time heat is passed upwardly between the spaced apart collection troughs and the spaced apart water circulating tubes to cook the food placed on the cooking grid.

Droppings from the food being cooked falls from the food between the water circulating tubes and between the water collection troughs to the briquettes, with only a small amount of such droppings passing through the briquettes and support screen to the burners or other components of the heat source. The briquettes and support screen are easily and inexpensively replaced, as necessary to maintain effective cooking and the life of the more expensive heat source is prolonged.

Other objects and features of the invention will become apparent to those skilled in the art to which the invention pertains from the following detained description and drawings, disclosing what is presently contemplated as being the best mode of the invention.

DRAWINGS

In the drawings:

FIG. 1 is a sectional view taken trough the housing of the water circulated grill of the invention; and FIG. 2, is a transverse section, taken on the line 2—2 of FIG. 1.

DETAILED DESCRIPTION

Figure 1:
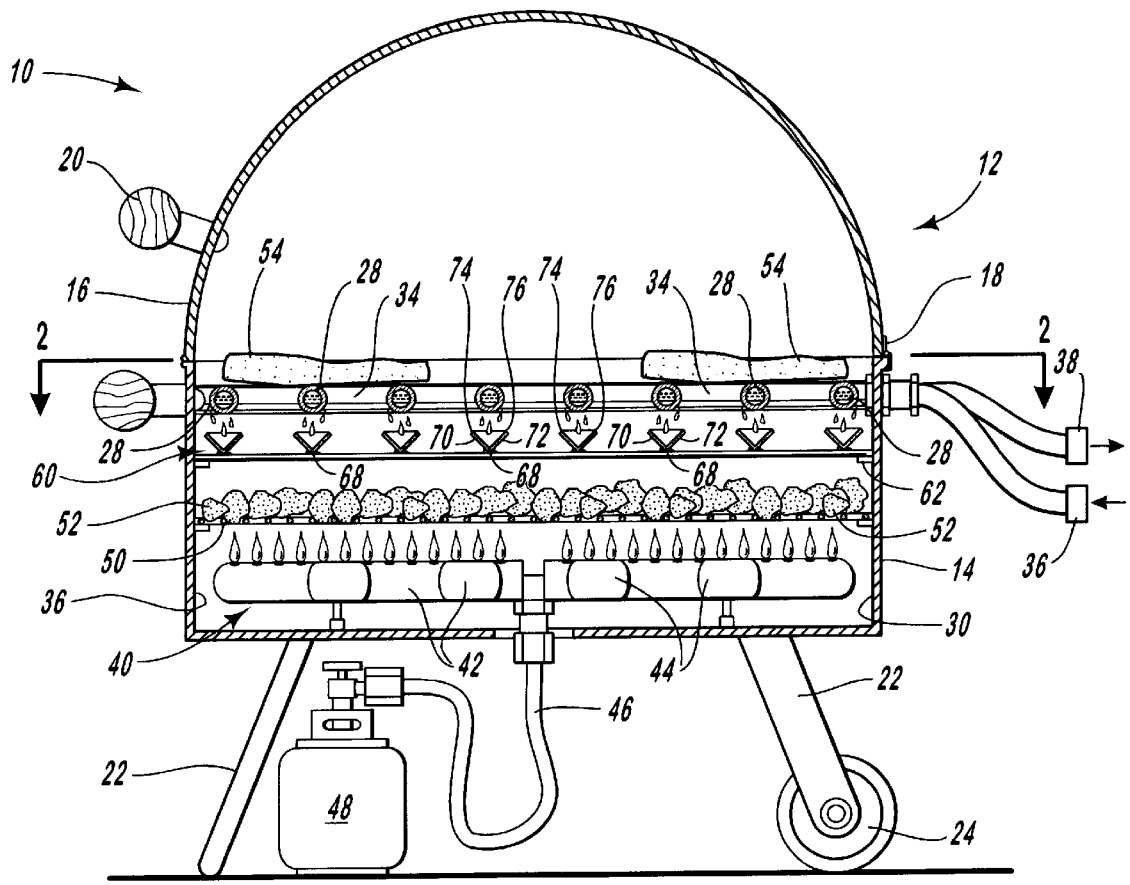
Figure 2:
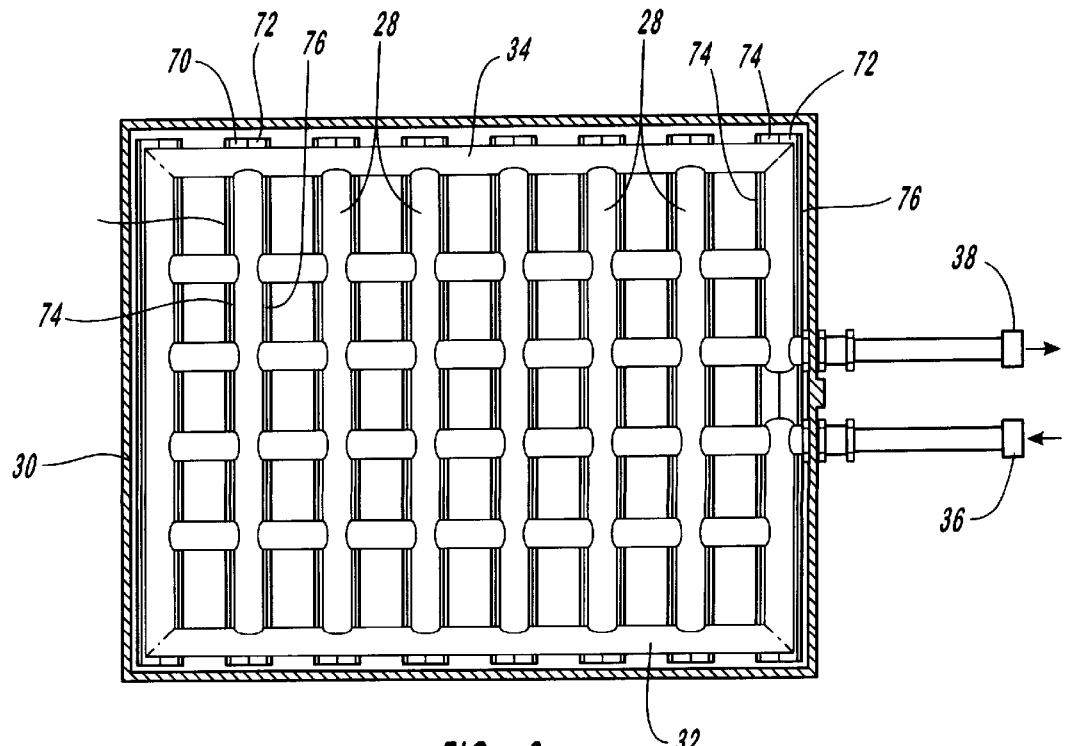

Referring now to the drawings:

In the illustrated preferred embodiment of the invention, the water circulated grill is shown generally at 10. As shown, grill 10 includes a housing 12 with a base 14 and a hood 16 hinged to base 14 at hinge 18. A handle 20 on the hood 16 allows a user to pivot the hood about hinge 18 for access to the interior of housing 12. Legs 22 project downwardly from base 14 and some or all of the legs may be provided with a wheel 24 to facilitate movement of the grill 10.

A cooking grid, 26 is shown resting on ribs 28 provided on the inside wall 30 of base 14. Cooking grid 22 includes a plurality of spaced apart tubes 28 with their opposite ends connected into end tubes 32 and 34. End tube 32 has a coupling 36 that is used to connect the tube to a source of water, not shown. End tube 34 has a coupling 38 that is used to connect the tube to a discharge line, not shown. Water supplied to tube 32 is circulated through the tubes 28 and tube 34 to discharge.

A heat source 40, including a pair of burners 42 and 44 is provided in the bottom of base 14. The burners are connected by a hose 46 to a fuel source such as a propane tank 48.

A support screen 50 is positioned in base 14 and rests on ribs 52 provided on the inside wall 30 of base 14, above the burners 42 and 44. The support screen has briquettes 52 loosely spread thereover and both the support screen and the briquettes serve to diffuse the heat from the burners 42 and 44 for even heat distribution. As is well known, the briquettes may also provide flavoring to the food 54 being cooked on the cooking grid 26.

A drip water collector 60 is positioned in the base 14, between the cooking grid 26 and the briquettes 52. The drip water collector is supported on ribs 62 on the inside wall 30 of base 14. The drip water collector is formed with spaced apart collection troughs 64. interconnected by spaced apart straps 66. Collection troughs 64 are each positioned to have a low, central length 68 directly beneath a tube 28 and upwardly extending wings 70 and 72, extending from the central length outwardly to side edges 74 and 76 positioned just below the outermost sides of the tube 28 above the collection trough 64. So arranged and positioned the collection troughs 64 will collect all water condensing on and falling from the tubes 28. Heat from the heat source is passed upwardly through the screen 50, briquettes 52 and between the collection troughs 64 to cook the food 54.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A water circulated grill comprising a housing, including means providing access to the interior of said housing;

a water cooled grid having spaced apart tubes for water flow serving as a food support in said housing;

a source of heat in said housing and positioned beneath said water cooled grid;

a drip water collector positioned in said housing between said water cooled grid and said source of beat, said drip water collector including spaced apart water collection troughs, with each said trough being positioned beneath a spaced apart tube of said water cooled grid and each said collection trough including a low, central length and upwardly and outwardly extending wings terminating in edges positioned just outside the outermost sides of the spaced apart tube positioned above said water collection trough.

2. A water circulated grill as in claim 1 further comprising a support screen in the housing and positioned between said water cooled grid and said source of heat; and briquettes carried by said support screen, whereby heat from the source of heat is diffused upwardly through said screen and said briquettes and passes between said collection troughs to cook food on said water cooled grid and water condensing on and falling from said water cooled grid is collected in said water collection troughs to be heated by heat from said heat source.

* * * * *